United States Patent [19]
Johnsson

[11] 3,774,486
[45] Nov. 27, 1973

[54] FEEDING AND CUTTING DEVICE

[75] Inventor: Bo Johnsson, Kungsbacka, Sweden

[73] Assignee: Svenska Rotor Maskiner Aktiebolag, Nacka, Sweden

[22] Filed: May 2, 1972

[21] Appl. No.: 249,670

[30]     Foreign Application Priority Data
  May 3, 1971    Great Britain.................. 12,744/71

[52] U.S. Cl.................................... 83/277, 83/238
[51] Int. Cl........................................... B26d 5/20
[58] Field of Search...................... 83/202, 206, 225, 83/238, 241, 244, 276, 277, 278, 86, 88, 452, 160, 453, 461

[56]            References Cited
            UNITED STATES PATENTS
| | | | |
|---|---|---|---|
| 3,512,438 | 5/1970 | Burdge............................. | 83/277 X |
| 3,231,099 | 1/1966 | Kidd................................. | 83/277 X |
| 3,667,331 | 6/1972 | Regec et al...................... | 83/277 X |
| 3,194,100 | 7/1965 | Fehlberg......................... | 83/277 X |
| 3,052,144 | 9/1962 | Runge............................. | 83/277 X |
| 1,655,471 | 1/1928 | Marcell............................. | 83/277 |

FOREIGN PATENTS OR APPLICATIONS
1,218,699   12/1959   France................................. 83/277

*Primary Examiner*—Andrew R. Juhasz
*Assistant Examiner*—W. D. Bray
*Attorney*—Flynn & Frishauf

[57]            ABSTRACT

A machine for cutting superposed layers of sheet material to successively form element plates of substantially continuously varying width for heat exchangers and for collecting said plates in stacked relationship, said machine including reciprocatable means for intermittently feeding desired lengths of superposed strips of sheet material to and beyond the shears of a shearing machine in timed relationship to the strokes of the shearing machine and means for stepwise varying the lengths of strips of sheet material fed to the shearing machine for each successive shearing operation.

8 Claims, 1 Drawing Figure

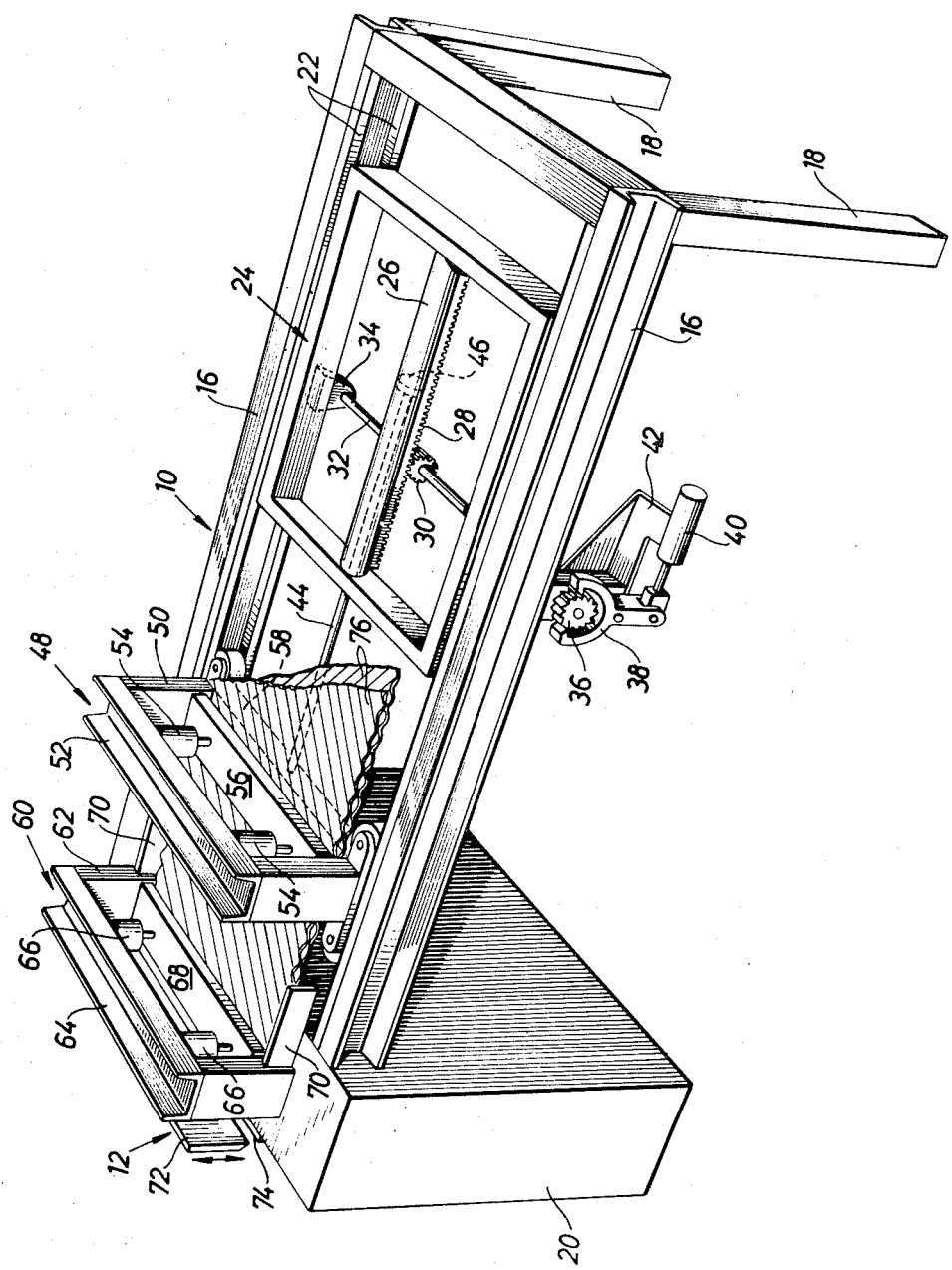

FEEDING AND CUTTING DEVICE

This invention relates to a machine for cutting superposed layers of sheet material, preferably sheet metal, to form element of substantially continuously varying width plates for heat exchangers and for collecting the element plates thus formed in stacked relationship.

In rotary regenerative heat exchangers such as air preheaters of the Ljungström type the heat exchanging or regenerative mass usually consists of profiled metal plates which are stacked in face to face relation in sectorial compartments of a stationary or rotatable annular regenerator body so as to form axially extending passages for the heat exchanging fluids. Often such plates are packed in bundles or baskets as shown for instance in British Pat. Nos. 1 061 454 and 1 174 513 before being placed in the regenerator body.

In modern air preheaters the regenerative mass may comprise undulated plates which are provided with axially extending parallel ridges and are separated from each other by plane or solely undulated plates. These lastmentioned plates are necessary for preventing undesired interference between the ridges of adjacent plates.

In British Pat. No. 1 105 900 there is disclosed a method for simultaneously cutting two or more superposed layers of sheet material. By using this method in the manufacture of plates for heat exchangers it is possible to eliminate the time-consuming intermixing of plates of two types when filling the baskets. However, the feeding and indexing means of the machine illustrated and described in British Pat. No. 1 105 900 do not work satisfactorily due to inadequate accuracy.

SUMMARY OF THE INVENTION

The machine according to the invention for making plates of substantially continuously varying width comprises a shearing machine, means for intermittently feeding superposed strips of sheet material in a substantially horizontal plane to and beyond said shearing machine in timed relationship to the strokes of said shearing machine, said feeding means including a reciprocating gripping device movable between a pick-up position and a release position, and a stationary clamping device located between said release position of said gripping device and the shears of the shearing machine and adapted to firmly hold said strips during the shearing operation and during the return stroke of said gripping device. Further included is means for stepwise varying the pick-up position of the reciprocatable gripping device for each successive shearing operation.

The invention will now be described more in detail with reference to the accompanying drawing which shows a diagrammatic perspective view of a cutting machine embodying the invention.

The machine shown in the drawing comprises a feeding section 10 and a shearing section 12.

As shown in the drawing the feeding section 10 includes two horizontal parallel girders 16 supported at one end by legs 18 and at the other end by the base 20 of the shearing section 12. To each of the confronting vertical surfaces of the two girders 16 are secured two rails 22.

Between the two girders 16 there is mounted a carriage 24 which is movable along and guided by the rails 22. The carriage is comprised of a rectangular frame which may be provided with rollers (not shown) cooperating with the rails 22. In the frame 24 is mounted a cylinder 26 of a servo motor of the piston and cylinder type. To the lower side of the cylinder 26 is secured a rack 28 meshing with a gear wheel 30 which is secured to a shaft 32. This shaft 32 extends transversely between the girders 16 which are provided with journal bearings 34 for the shaft.

At one end the shaft 32 carries a ratchet wheel 36 which cooperates with a pallet 38 in such manner as to form an escapement device controlled by a double-acting servo motor 40 supported by a bracket 42.

A piston rod 44 of a piston 46 of the servo cylinder 26 is connected to a gripping device 48. This device comprises a low vertical rectangular frame 50 which constitutes a carriage or slide and may be reciprocated along the girders 16 by the action of the servo motor 26. The upper horizontal beam 52 of the frame 50 carries two vertical rams 54 having piston rods connected to a pressure plate 56 adapted to be moved towards and away from the lower horizontal beam 58 of the frame 50.

On the top of the base 20 of the shearing section 12 there is mounted a stationary clamping device 60 similar to the movable gripping device 48 and comprising a frame 62 including an upper horizontal beam 64, rams 66 and a pressure plate 68. Further, to the short vertical beams of the frame 62 are secured two stop members 70 adapted to be engaged by the vertical beams of the frame 50 of the gripping device 48 in order to limit the movement of said gripping device 48 towards the clamping device 60.

The drawing also indicates diagrammatically a movable shear 72 and a stationary shear 74 of a shearing machine and also illustrates the end portions of two superposed strips 76 of corrugated sheet material the corrugations of the two strips crossing each other. The two strips 76 may be supplied to the machine in any convenient manner for instance directly from rolling mills as shown and described in British Pat. No. 1 105 900.

The servo motors and rams are in conventional manner provided with connecting means for pressure fluid conduits but for the sake of simplicity these connections and conduits are omitted from the drawing. Preferably, the servo motors and rams are of the pneumatic type.

The machine functions as follows:

In the position shown the gripping device 48 is inoperative while the clamping device 60 is operative to hold the strips 76 stationary. Pressure fluid is supplied to the left end of the servo motor cylinder 26 so that the piston 46 moves inwardly into the cylinder and the gripping device 48 is moved to the right. When the piston 46 reaches the end of the cylinder 26 the movement is stopped. At this stage the gripping device 48 is rendered operative while the clamping device 60 is released and pressure fluid is supplied to the right end of the servo motor cylinder 26 so that the gripping device 48 moves towards the shearing section 12 and pushes the strips 76 through the inoperative clamping device 60 and under the movable shear 72 of the shearing machine. When the gripping device 48 reaches the stop members 70 the clamping device 60 is rendered operative and the movable shear 72 performs its cutting stroke, thereby severing two plates of a certain width from the two strips 76.

During the operation just described the shaft 32 has been held stationary by the pallet 38 engaging the ratchet wheel 36, thus preventing movement of the frame 24. When the gripping device 48 is moved towards the shearing section the fluid pressure in the cylinder 26 to the right of the piston 46 biases the frame 24 to the right. When the gripping device 48 has reached the stop elements 70 and while the pressure in the right hand portion of the cylinder 26 is still maintained the servo motor 40 is activated to swing the pallet 38, thus in known manner permitting the ratchet wheel 36 to turn clock-wise through an angle corresponding to the pitch of the teeth of the ratchet wheel and the frame 24 to move a small distance to the right.

At this point the gripping device 48 is rendered inoperative and pressure fluid is supplied to the left end of the servo motor cylinder 26 and the piston 46 moves inwardly in the cylinder 26 to the end thereof. Since the frame 24 has moved a predetermined distance to the right from its previous position it is evident that the gripping device 48 will now stop in a pick-up position which is located correspondingly at a further distance from the stop members 70. Accordingly, when the gripping device 48 is again rendered operative and is moved towards the stop members 70 while pushing the strips 76 through the now released clamping device 60 and beyond the elevated shear 72 in the manner described above, a greater length of the strips 76 will be pushed out beyond the shears 72, 74 than at the previous time, thereby resulting in a somewhat greater width of the plates severed from the strips at the subsequent cutting stroke of the movable shear 72. Consequently, the step-by-step adjustment of the axial position of the servo motor cylinder 26 and thereby of the pick-up position of the gripping device results in successive changes of the width of the plates consecutively severed from the strips.

The element plates thus formed are collected in any convenient manner to form a stack and due to the successively increasing width of the plates this stack becomes wedge-shaped. By using ratchet wheels of different tooth pitch it is possible to obtain different wedge angles so that the stacks may be given any required form to suit the sectorial compartments of any regenerator body irrespective of the number of compartments.

The timing of the many operations performed by the servo motors and rams may be produced in known manner by using, for instance, limit switches and solenoid valves governed thereby and also other devices and instruments well known within the pneumatic and hydraulic field.

While the shearing machine is preferably pneumatically operated other types of shearing machines may also be used, for instance, machines of the eccentric press type.

What we claim is:

1. A machine for cutting superposed layers of sheet material to successively form element plates of substantially continuously varying width for heat exchangers and for collecting the element plates thus formed into stacked relationship comprising:
    a shearing machine having shears,
    means for intermittently feeding superposed strips of sheet material in a substantially horizontal plane to and beyond the shears of said shearing machine in timed relationship to the strokes of said shears, said feeding means including a reciprocatable gripping device movable between an adjustable pick-up position and a fixed release position,
    means for step-wise varying the pick-up position of the reciprocatable gripping device for each successive shearing operation, and
    a stationary clamping device located between said release position of said gripping device and the shears of the shearing machine and adapted to hold said strips firmly during the shearing operation and during the return stroke of said gripping device.

2. A machine according to claim 1 wherein said fixed release position of said reciprocatable gripping device is defined by a fixed stop member.

3. A machine according to claim 1 wherein: said machine includes a stationary support member,
    said feeding means comprises a reciprocating slidable member carrying said gripping device and connected to one member of a servo motor, and an abutment member connected to the other member of said servo motor, said abutment member being adjustably connected to said stationary support member of the machine, and
    said means for step wise varying the pick-up position of the gripping means includes means for step wise varying the position of said abutment member relative to said stationary support member for each successive shearing operation.

4. A machine according to claim 3 wherein said step wide varying means includes a rotatable shaft coupling said abutment member to said stationary support member and means for turning said shaft by a given angle for each successive shearing operation.

5. A machine according to claim 4 wherein said rotatable shaft is rotatably journalled to said stationary support member, a first gear means connected to said rotatable shaft, and a second gear means coupled to said abutment member and in engagement with said first gear means, such that rotation of said first gear means, caused by rotation of said rotatable shaft, causes relative movement between said abutment member and said stationary support member.

6. A machine according to claim 4 wherein said step wide varying means includes a ratchet and pawl mechanism coupled to said rotatable shaft, said ratchet being fixed to said shaft and said pawl mechanism being operable to selectively allow rotation of said ratchet by a given angle dependent upon the pitch of the teeth of said ratchet for each successive shearing operation.

7. A machine according to claim 6 wherein said rotatable shaft is rotatably journalled to said stationary support member, a first gear means connected to said rotatable shaft, and a second gear means coupled to said abutment member and in engagement with said first gear means, such that rotation of said first gear means, caused by rotation of said rotatable shaft, causes relative movement between said abutment member and said stationary support member.

8. A machine according to claim 6 wherein said ratchet is a ratchet wheel, and wherein said pawl is disengaged from said ratchet wheel when said gripping device is in its fixed release position to enable said ratchet wheel to rotate by an amount corresponding to one tooth thereof.

* * * * *

UNITED STATES PATENT OFFICE
CERTIFICATE OF CORRECTION

Patent No. 3,774,486          Dated November 27, 1973

Inventor(s) BO JOHNSSON

It is certified that error appears in the above-identified patent and that said Letters Patent are hereby corrected as shown below:

Column 4, lines 29 and 43, before "varying means" change "wide" to --wise--.

Signed and sealed this 9th day of April 1974.

(SEAL)
Attest:

EDWARD M. FLETCHER, JR.
Attesting Officer

C. MARSHALL DANN
Commissioner of Patents